US012754661B2

(12) United States Patent
Sun et al.

(10) Patent No.: US 12,754,661 B2
(45) Date of Patent: Oct. 6, 2026

(54) INTERACTION METHOD FOR INSTRUCTION CREATION INTERFACE AND INTERACTION INTERFACE BETWEEN USER AND AGENT

(71) Applicant: Beijing Zitiao Network Technology Co., Ltd., Beijing (CN)

(72) Inventors: Hui Sun, Beijing (CN); Yifan Ding, Beijing (CN); Geng Huang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/086,698

(22) Filed: Mar. 21, 2025

(65) Prior Publication Data

US 2025/0335073 A1 Oct. 30, 2025

Related U.S. Application Data

(63) Continuation of application No. PCT/CN2024/089875, filed on Apr. 25, 2024.

(51) Int. Cl.
*G06F 3/0482* (2013.01)
*G06F 3/0484* (2022.01)

(52) U.S. Cl.
CPC .......... *G06F 3/0484* (2013.01); *G06F 3/0482* (2013.01); *G06F 2203/04803* (2013.01)

(58) Field of Classification Search
CPC ......... G06F 3/0484; G06F 2203/04803; G06F 3/167; G06F 3/038; G06F 3/0488;
(Continued)

(56) References Cited

U.S. PATENT DOCUMENTS 11,151,518 B2 * 10/2021 Hwacinski ............ G06F 40/242
11,809,688 B1 11/2023 Parasnis et al.
(Continued)

FOREIGN PATENT DOCUMENTS

CN 107579885 A 1/2018
CN 114429765 A 5/2022
(Continued)

OTHER PUBLICATIONS

CN117289841A (Eng Translation) Published on Dec. 26, 2023 Inventor: Yang, Qitao.*
(Continued)

*Primary Examiner* — Rinna Yi
(74) *Attorney, Agent, or Firm* — Alleman Hall LLP

(57) ABSTRACT

The present disclosure relates to an interaction method, device, electronic apparatus, storage medium and program product, and involves the technical field of artificial intelligence. The interaction method of the present disclosure comprises: displaying, in response to a user triggering an instruction creation function, an instruction creation interface; determining prompt information corresponding to a target instruction according to information for creating the target instruction input by the user in the instruction creation interface, wherein the target instruction is configured to indicate demand information of the user for an interaction function of an Agent; and generating and displaying an operation control of the target instruction according to the prompt information.

19 Claims, 7 Drawing Sheets

(58) Field of Classification Search
CPC ............. G06F 3/041; G06F 2203/0381; G06F 3/0482; G10L 15/00; G10L 15/20; G10L 15/22; G10L 15/26; G10L 2015/225; G10L 21/06; G10L 21/10; G10L 15/193; G10L 15/30; G10L 15/265; H04M 1/271; H04M 1/72519; H04M 3/4936; G01C 21/3608; G01C 21/3629; G08G 1/096877
See application file for complete search history.

(56) References Cited

U.S. PATENT DOCUMENTS

| | | | | |
|---|---|---|---|---|
| 2019/0066677 | A1* | 2/2019 | Jaygarl | G10L 15/30 |
| 2022/0284890 | A1 | 9/2022 | Contractor et al. | |
| 2025/0103962 | A1* | 3/2025 | Turley | G06N 20/00 |
| 2025/0117573 | A1* | 4/2025 | Azose | G06N 20/00 |
| 2025/0181215 | A1* | 6/2025 | Saleh | G06F 3/0482 |
| 2025/0272117 | A1* | 8/2025 | Hariri | G06F 9/54 |

FOREIGN PATENT DOCUMENTS

| | | | |
|---|---|---|---|
| CN | 117094285 | A | 11/2023 |
| CN | 117170550 | A | 12/2023 |
| CN | 117289841 | A | 12/2023 |
| CN | 117610580 | A | 2/2024 |
| CN | 117827804 | A | 4/2024 |
| JP | 2022170722 | A | 11/2022 |

OTHER PUBLICATIONS

CN117827804A (Eng Translation) Published on Apr. 5, 2024 Inventor: Yu, Peng.*

ISA China National Intellectual Property Administration, International Search Report and Written Opinion Issued in Application No. PCT/CN2024/089875, Dec. 19, 2024, WIPO, 20 pages.

European Patent Office, Extended European Search Report Issued in Application No. 24863858.7, Nov. 18, 2025, Germany, 8 pages.

* cited by examiner

INTERACTION METHOD FOR INSTRUCTION CREATION INTERFACE AND INTERACTION INTERFACE BETWEEN USER AND AGENT

CROSS-REFERENCE TO RELATED APPLICATIONS

The present disclosure is a continuation application under 35 U.S.C. § 111(a) of International Patent Application No. PCT/CN2024/089875, filed on Apr. 25, 2024, the disclosure of which is hereby incorporated into this disclosure by reference in its entirety.

TECHNICAL FIELD

The invention relates to the technical field of artificial intelligence, in particular to an interaction method and device, an electronic apparatus, a storage medium and a program product.

BACKGROUND

With the development of Artificial Intelligence (AI) technology, Agents have gradually entered people's field of vision, and have been widely employed in various fields. Agents can be used to interact with users, for example, providing interaction services such as chat, question and answer, etc.

SUMMARY

This Summary is provided to introduce concepts in a brief manner, which will be elaborated in the Detailed Description later. This Summary is not intended to identify key features or essential features of the claimed technical solution, nor is it intended to limit the scope of the claimed technical solution.

According to some embodiments of the present disclosure, an interaction method is provided, comprising: displaying, in response to a user triggering an instruction creation function, an instruction creation interface; determining prompt information corresponding to a target instruction according to information for creating the target instruction input by the user in the instruction creation interface, wherein the target instruction is configured to indicate demand information of the user for an interaction function of an Agent; and generating and displaying an operation control of the target instruction according to the prompt information.

According to other embodiments of the present disclosure, an interaction device is provided, comprising a first display module configured to display, in response to a user triggering an instruction creation function, an instruction creation interface; a determination module configured to determine prompt information corresponding to a target instruction according to information for creating the target instruction input by the user in the instruction creation interface, wherein the target instruction is configured to indicate demand information of the user for an interaction function of an Agent; a second display module configured to generate and display an operation control of the target instruction according to the prompt information.

According to further embodiments of the present disclosure, an electronic apparatus is provided, comprising one or more processors; and one or more memories, coupled to the one or more processors, for storing instructions which, when executed by the one or more processors, cause the one or more processors to perform the interaction method provided in any of the embodiments of the present disclosure.

According to still further embodiments of the present disclosure, a computer-readable storage medium is provided, on which a computer program is stored, which, when executed by a processor, performs the interaction method provided in any of the embodiments of the present disclosure.

According to yet further embodiments of the present disclosure, a computer program product is provided, comprising instructions which, when executed by a processor, implement the interaction method provided in any of the embodiments of the present disclosure.

According to still further embodiments of the present disclosure, a computer program is provided, comprising instructions which, when executed by a processor, implement the interaction method provided in any of the embodiments of the present disclosure.

Other features, aspects and advantages of the present disclosure will become clear from the following detailed description of exemplary embodiments of the present disclosure with reference to the drawings.

BRIEF DESCRIPTION OF THE DRAWINGS

Preferred embodiments of the present disclosure will be described below with reference to the drawings. The referred drawings, each of which is included in and forms a part of this specification together with the detailed description below, are provided to render a further understanding of the present disclosure, and serve to illustrate the present disclosure. It should be understood that the drawings in the following description only relate to some embodiments of the present disclosure, and do not constitute a limitation on the present disclosure. In the drawings.

Figure 1:
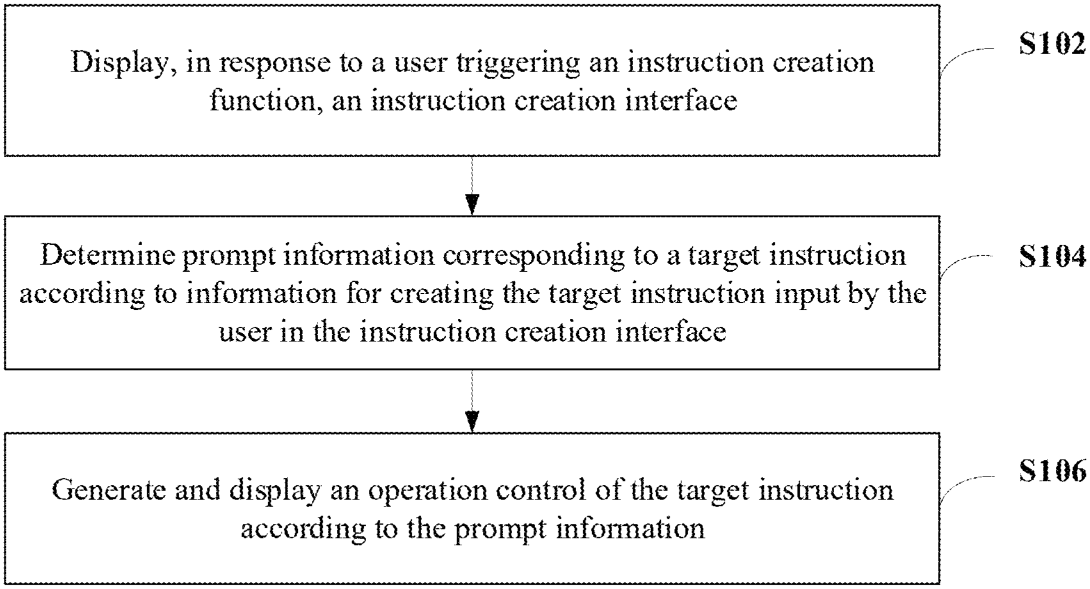
FIG. 1 is a flowchart of an interaction method provided in some embodiments of the present disclosure.

It should be understood that for the convenience of description, dimensions of various parts shown in the drawings are not necessarily drawn to an actual scale. The same or similar reference numerals are used in the drawings to indicate the same or similar parts. Therefore, once an item is defined in one drawing, it may not be discussed further in the subsequent drawings.

DETAILED DESCRIPTION

The technical schemes in the embodiments of the present disclosure will be clearly and completely described with reference to the drawings in below, but obviously, the described embodiments are only some of the embodiments of the present disclosure, not the whole of them. The following description of the embodiments is merely illustrative in nature and is in no way intended to limit the present disclosure, its application or uses. It should be understood that the present disclosure can be embodied in various forms and should not be construed as limited to the embodiments set forth herein.

It should be understood that steps described in the method embodiments of the present disclosure may be performed in a different order and/or in parallel. Furthermore, the method embodiments may include additional steps and/or omit performing the illustrated steps. The scope of the present disclosure is not limited in this respect. Unless otherwise specified, relative arrangement of parts and steps, numerical expressions and numerical values set forth in these embodiments should be interpreted as merely exemplary and not limiting the scope of the present disclosure.

The term "comprising" and its variants used in the present disclosure means an open term comprising at least its following elements/features, but not excluding other elements/features, that is, "comprising but not limited to". In addition, the term "including" and its variants used in the present disclosure means an open term including at least its following elements/features, but not excluding other elements/features, that is, "including but not limited to". Therefore, "comprising" is synonymous with "including". The term "based on" means "at least partially based on".

Reference throughout this specification to "one embodiment", "some embodiments" or "embodiments" means that a particular feature, structure or characteristic described in connection with an embodiment is included in at least one embodiment of the present invention. For example, the term "one embodiment" means "at least one embodiment"; the term "another embodiment" means "at least one other embodiment"; the term "some embodiments" means "at least some embodiments". Moreover, the appearances of the phrases "in an embodiment", "in some embodiments" or "in embodiments" in various places throughout the specification do not necessarily all refer to the same embodiment, but they may also refer to the same embodiment.

It should be noted that the concepts of "first", "second" and the like mentioned in the present disclosure are only used to distinguish different devices, modules or units, and are not used to limit the order or interdependence of functions performed by these devices, modules or units. Unless otherwise specified, the concepts of "first", "second" and the like are not intended to imply that the objects so described must be in a given order in time, space, ranking or in any other way.

It should be noted that the modifications of "one" and "multiple" mentioned in the present disclosure are schematic rather than limiting, and those skilled in the art should understand that unless the context clearly indicates otherwise, they should be understood as "one or more".

Names of messages or information exchanged among multiple devices in the embodiment of the present disclosure are only used for illustrative purposes, and are not used to limit the scope of these messages or information.

Embodiments of the present disclosure will be described in detail with reference to the drawings, but the present disclosure is not limited to these particular embodiments. The following particular embodiments can be combined with each other, and the same or similar concepts or processes may not be repeated in some embodiments. Furthermore, in one or more embodiments, specific features, structures, or characteristics may be combined in any suitable manner that will be apparent to those skilled in the art from the present disclosure.

In a process of interacting with an Agent, a user often has some specific demands for the interaction functions of the Agent, hoping that the Agent can output specific types of responses. For example, the user asks the Agent to tell a story, and hopes that general content and number of words of the story can meet certain requirements.

If the user want to control the Agent to realize a specific interaction function and meet a specific demand, detailed demand information is required to be input, so that the Agent can output a specific type of response according to the input information. If the user uses the specific interaction function frequently, detailed demand information need to be input repeatedly, thus reducing interaction efficiency and decreasing user experience.

Based on the above problems, the present disclosure provides an interaction method, which will be described below with reference to FIGS. 1 to 4C.

FIG. 1 is a flow chart of some embodiments of the interaction method in the present disclosure. As shown in FIG. 1, the method of this embodiment comprises steps S102~S106.

In step S102, an instruction creation interface is displayed, in response to a user triggering an instruction creation function.

The user can trigger the instruction creation function in any way, for example, through controls, through voice, through preset actions, etc., and there is no limitation here. The user can trigger the instruction creation function in various distribution scenarios.

In step S104, prompt information corresponding to a target instruction is determined according to information for creating the target instruction input by the user in the instruction creation interface.

The user can input the information for creating the target instructions through various forms such as text and voice, and there is no restriction here. The information for creating the target instruction can be directly used as prompt information (Prompt) corresponding to the target instruction. However, in general, information input by ordinary users to create the target instruction cannot control output of the Agent well, and repeated modifications and adjustments according to the output of the Agent are required, so that the output of the Agent can meet the requirements. Therefore, the prompt information corresponding to the target instruction can be automatically generated according to the information for creating the target instruction. Compared with the information for creating the target instruction, the prompt information is more convenient to be understood by a machine learning model corresponding to the Agent, capable of making the output of the Agent meet the requirements better and improving operation efficiency.

The Agent can be realized based on a machine learning model, and can interact with the user. The content of interaction may include text, voice, images and other forms of content, so there is no restriction here. The machine learning model is, for example, LLM (Large Language Model), and is not limited to the given examples. The prompt information is configured to be input the machine learning model corresponding to the Agent, so that the machine learning model can output a specific type of response according to the prompt information.

The target instruction is configured to configured to indicate demand information of the user for an interaction function of the Agent. For example, the target instruction is configured to indicate that the user hopes that the Agent can realize the interaction function of Chinese-French translation. For example, the target instruction is configured to indicate that the user hopes that the Agent can realize an interaction function of creating an article. The information for creating the target instruction can be description information of the target instruction, for example, demand description information such as a number of words, an expressing manner and the like of the output French in the process of Chinese-French translation.

In step S106, an operation control of the target instruction is generated and displayed according to the prompt information.

For example, the prompt information is displayed, the operation control of the target instruction is generated in response to a confirmation operation of the user on the prompt information. The operation control of the target instruction can be displayed in one or more distribution scenarios. For example, the operation control of the target instruction is used to send the target instruction to the Agent corresponding to the target instruction in response to the user's triggering, so that the Agent corresponding to the target instruction can generate response information according to the target instruction.

The above embodiment provides a method of creating an instruction for the user: in response to the user triggering the instruction creation function, the instruction creation interface is displayed, and the user can input the information for creating the target instruction in the instruction creation interface, and the prompt information corresponding to the target instruction is automatically determined, thereby the operation control of the target instruction according to the prompt information is generated and displayed. Based on the method of the above embodiment, the user can customize a personalized instruction, and the operation of creating instructions is simple and convenient, and the creation of instructions can be completed quickly. Because the operation control of the target instruction is generated, in a case where the user wants to use the interaction function corresponding to the target instruction, the interaction function corresponding to the target instruction can be called for interaction by only triggering the operation control. Especially in a case where the operation control of the target instruction is frequently used, convenience and efficiency of the operation can be greatly improved, thus increasing the user-Agent interaction efficiency, and enhancing the user experience.

The user can trigger the instruction creation function in various ways, so as to display the instruction creation interface, which is described below in connection with some embodiments.

In some embodiments, an operation control of the instruction creation function is displayed; and the instruction creation interface is displayed in response to the user triggering the operation control of the instruction creation function.

The operation control of the instruction creation function can be displayed on one or more pages. For example, the operation control of the instruction creation function is displayed on an interaction page between the user and the Agent; for another example, the operation control of the instruction creation function is displayed on a home page of an application, which is not limited to the examples given here.

In some embodiments, the interaction interface between the user and the Agent is displayed, and an instruction check control is displayed on the interaction interface between the user and the Agent; in response to the user triggering the instruction check control, the instruction display interface is displayed, and the operation control of the instruction creation function is displayed in the instruction display interface. The instruction display interface can also include one or more created instructions.

Figure 2A:
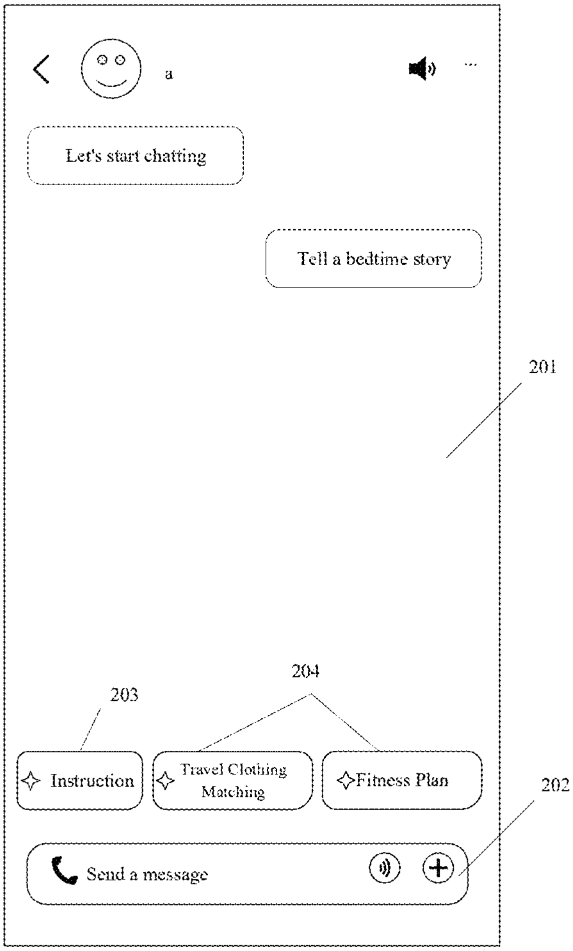
FIG. 2A~4C are schematic diagrams of an interaction interface provided in some embodiments of the present disclosure.

An interaction interface between a user and an Agent a, as shown in FIG. 2A, can be divided into a display area 201 for displaying interaction information between the user and the Agent a. The interaction interface can also include an input area 202, where the user can input information, such as text, voice, etc. An "instruction" control 203 can be displayed in the display area 201, and of course the "instruction" control 203 can also be displayed in the input area. The "instruction" control 203 may be an instruction check control or an operation control of an instruction creation function. In a case where the "instruction" control 203 is the instruction check control, an instruction display interface as shown in FIG. 2B or 2C can be displayed in response to the user triggering the "instruction" control 203.

As shown in FIG. 2A, one or more controls 204 of one or more candidate instructions can also be displayed on the interaction interface, for example, "Travel Clothing Matching" and "Fitness Plan". The one or more candidate instructions are instructions created by the user or recommended instructions. The recommended instructions can be created by other users or provided by an application.

Figure 2B:
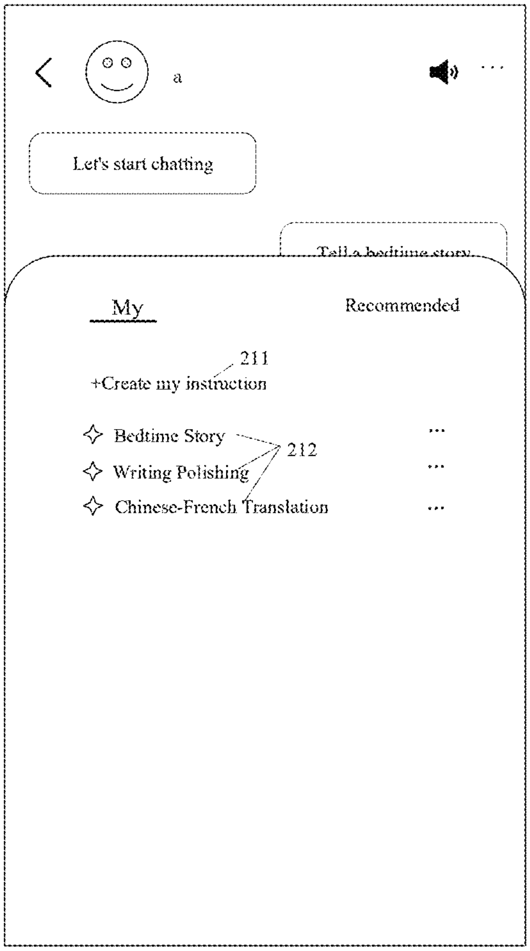

As shown in FIG. 2B, the instruction display interface can be a half-screen interface, or other arbitrary forms, such as a full-screen arbitrary, a window, a floating layer, etc., and there is no restriction here. The instruction display interface can include a first tab page, for example, the first tab page is a "My" tab page. The "My" tab page can display the operation control "Create My Instruction" 211 of the instruction creation function, and can also display the created instructions 212. The instruction display interface can also include a second tab page, for example, the second tab page is a "Recommended" tab page. One or more recommended instructions can be displayed in the "Recommended" tab page. The one or more recommended instructions can be created by another user or provided by an application, and one or more instructions can be selected as the one or more recommended instructions according to usage times, usage frequency, popularity (e.g., evaluation, etc.) and other indicators of all instructions.

Figure 2C:
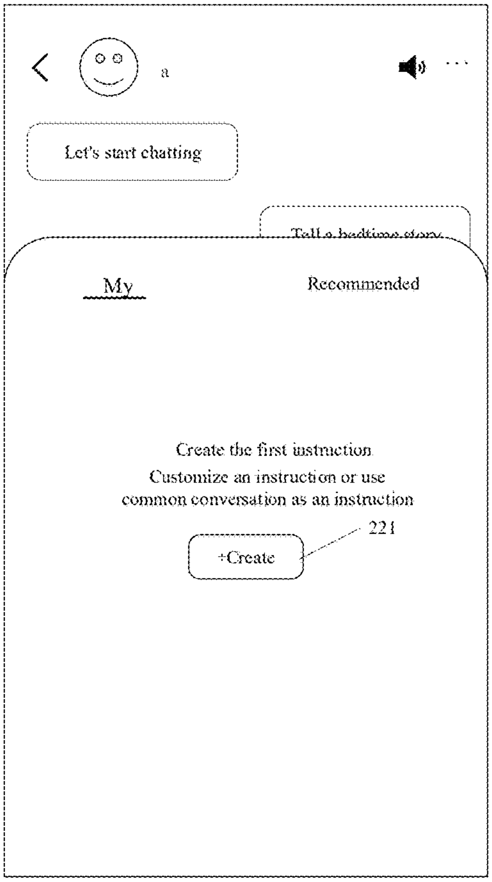

As shown in FIG. 2C, in a case where the user does not have any created instruction, the operation control "Create" 221 of the instruction creation function can be directly displayed, and corresponding guidance information can be displayed to guide the user to customize an instruction or save common conversation as an instruction, in the instruction display interface.

Figure 2D:
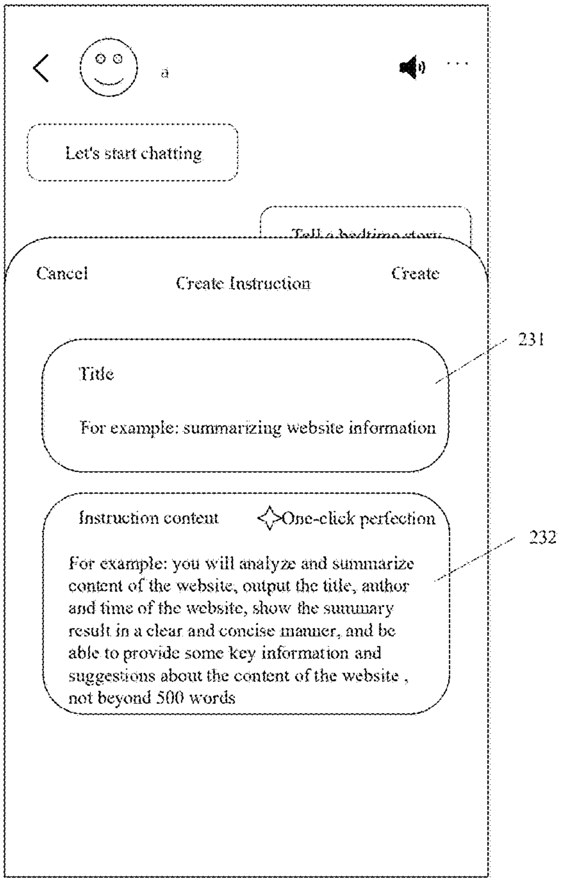

In response to the user triggering of the control of "Create My Instruction" or the control of "Create", the instruction creation interface as shown in FIG. 2D can be displayed. Alternatively, in a case where the "instruction" control 203 is an operation control of the instruction creation function, the instruction creation interface as shown in FIG. 2D can be displayed in response to the user triggering the "instruction" control 203.

In some embodiments, the instruction creation interface includes a title input area and an instruction content input area. Of course, the instruction creation interface can also include only one area for inputting information for creating the target instruction. As shown in FIG. 2D, the instruction creation interface includes a title input area 231 and an instruction content input area 232. In a case where the title input area is in an unoperated state, first guidance information is displayed, for example, the first guidance information includes an example of a title, as shown in FIG. 2D, and the first guidance information is "for example, summarizing website information". In a case where the instruction content input area is in an unoperated state, second guidance information is displayed. For example, the second guidance information includes an example of prompt information, as shown in FIG. 2D, and the first guidance information is "For example, you will analyze and summarize content of the website . . . ". The first guidance information and the second guidance information can be used to guide the user to input the title and content of an instruction, thus improving convenience of the user's operation.

The information for creating the target instruction can be input in the title input area and the instruction content input area in the form of text or voice, etc. In some embodiments, the information for creating the target instruction includes at least one of the title of the target instruction or the content of the target instruction; the title of the target instruction is displayed in the operation control of the target instruction, in response to the information for creating the target instruction comprising the title of the target instruction; a title generated according to the prompt information is displayed in the operation control of the target instruction, in response to the information for creating the target instruction not comprising the title of the target instruction.

The user can input only the title of the target instruction or only the content of the target instruction. The title of the target instruction can be displayed in the operation control of the target instruction. For example, "Fitness Plan" shown in FIG. 2A is the title of the instruction, facilitating the user to check and quickly select the instruction. If the user does not input the title of the target instruction, the title of the target instruction can be generated according to the prompt information corresponding to the target instruction. For example, the machine learning model is used to summarize the prompt information to generate the title of the target instruction.

In the above embodiments, through directly triggering the control of the instruction creation function, the user can trigger the display of the instruction creation interface and then input the information for creating the target instruction, thus improving the convenience and efficiency of the user's operation.

The user can also use information has already been input as the target instruction to create. In some embodiments, in response to the user inputting first interaction information, the first interaction information is displayed; and the instruction creation interface is displayed, and the first interaction information is displayed in the instruction creation interface as information for creating the target instruction, in response to the user triggering the instruction creation function for the first interaction information.

Figure 3A:
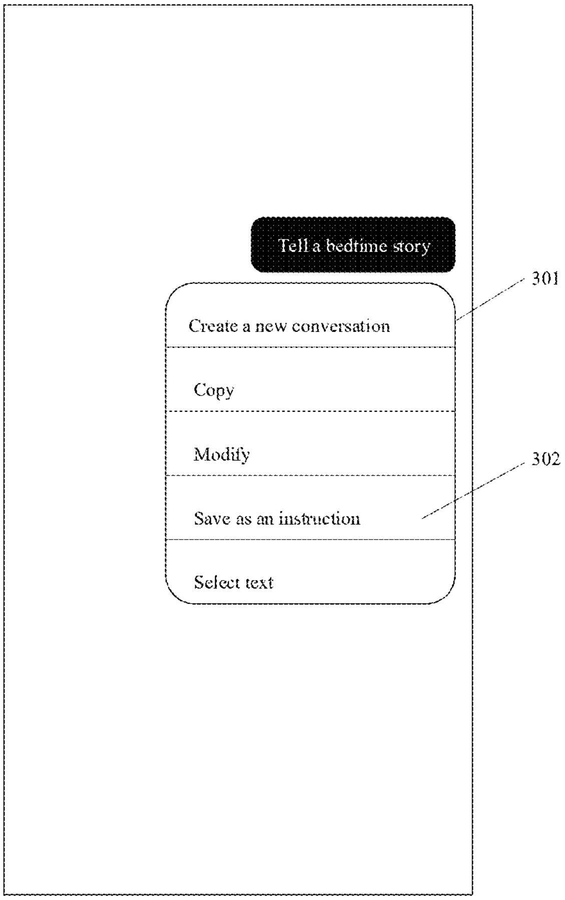

The first interaction information input by the user is displayed in the interaction interface between the user and the Agent. For example, as shown in FIGS. 2A and 3A, the first interaction information is "Tell a bedtime story". For example, in response to a preset operation of the user on the first interaction information, an information operation interface is displayed, and an instruction saving control is displayed in the information operation interface; in response to the user triggering the instruction saving control (that is, triggering the instruction creation function for the first interaction information), the instruction creation interface is displayed, and the first interaction information is displayed in the instruction creation interface as the information for creating the target instruction.

As shown in FIG. 3A, the user can trigger a display of an information operation interface 301 through a preset operation such as long press, double click, etc. The information operation interface can be displayed in a form of floating layer, window, etc., which is not limited to the examples in the figure. While displaying the information operation interface, first interaction information can be displayed with an outstanding effect, and a mask layer can be added to the interaction interface to avoid mutual influence of the displayed contents. In the information operation interface, an instruction saving control 302 of "save as instruction" can be displayed, and in response to the user triggering the instruction saving control 302, the instruction creation interface is displayed. Other controls can also be displayed in the information operation interface, for example, "Create New Dialogue" control for sending the first interaction information to another interaction object to create a new dialogue, "Copy" control for copying the first interaction information, "Modify" control for modifying the already sent first interaction information, and "Select Text" control for selecting part or all of the text in the first interaction information.

Figure 3B:
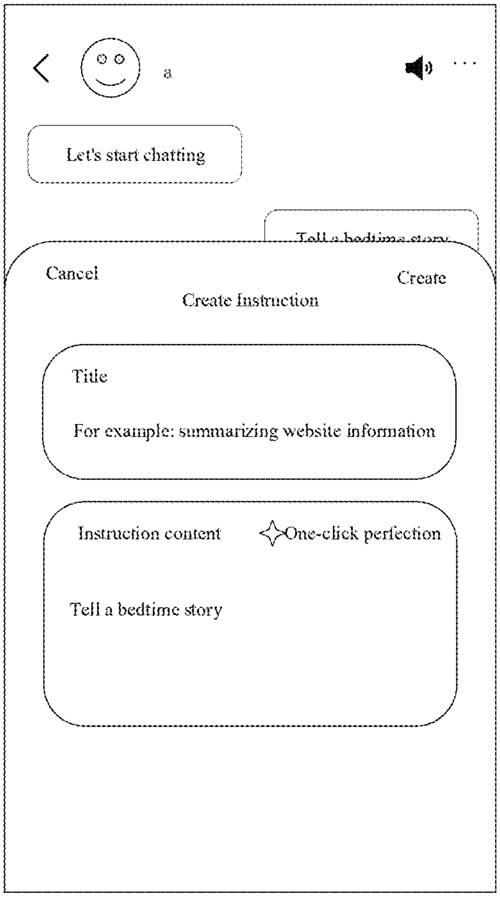

As shown in FIG. 3B, in response to the user triggering the instruction saving control 302, the first interaction information can be displayed in the instruction content input area of the instruction creation interface. The user can continue to perform an edit operation on the first interaction information and input information for creating the target instruction.

The user can also trigger the instruction creation function for the first interaction information through voice or other operations, which is not limited to the given examples. The user can also trigger the instruction creation function by other means, such as voice, preset actions, etc., which will not be elaborated here.

How to determine the prompt information corresponding to the target instruction according to the information for creating the target instruction input by the user in the instruction creation interface is described below in connection with some embodiments.

In some embodiments, structured prompt information corresponding to the target instruction is generated according to the information for creating the target instruction input by the user in the instruction creation interface.

The Structured prompt information can make the prompt information more standardized, clear and specific, and make the machine learning model better understand context and constraints of a task, so that the machine learning model can output more accurate and satisfying responses.

In some embodiments, the information for creating the target instruction is parsed to determine content of at least one of a task or an output comprised in the information for creating the target instruction; the content of at least one of the task or the output is expanded to generate task description information and output description information in the prompt information; the structured prompt information corresponding to the target instruction is generated according to the task description information and the output description information.

In many cases, the information for creating the target instruction input by the user cannot be well understood by the machine learning model because its content is too simple or its structure is not standardized enough, which causes the interaction function of the Agent not to meet needs of the user, that is, the output information does not meet the needs of the user. Therefore, the information for creating the target instruction can be expanded and perfected, so that the machine learning model can better understand it to output a more satisfying and more accurate response.

The information for creating the target instruction can be parsed by using the machine learning model to obtain at least one of the task or the output. For example, the task is "analyzing and summarizing information of the website", which can be a definition of the task to be completed or a role to be played by the machine learning model. For example, the output is "output a summary", which can include format, style of the output, etc. The information for creating the target instruction can also include constraints for constraining rules that the machine learning model needs to abide by when performing the task. The constraints can also be used as constraints on the output. The information for creating the target instruction can also include a sample, such as an output sample, etc. The more detailed the information for creating the target instruction, the more accurate the generated prompt information, the better the machine learning model understands, and the more satisfying the final output.

In a case where the user only input the task or output, the machine learning model can be used in expanding to generate the task description information and the output description information. The task output information and the output description information are more detailed than the task and the output in the information for creating the target instruction, so that the generated prompt information is more accurate. In a case where the information for creating the target instruction also includes constraints, the constraints can also be expended.

If the information for creating the target instruction only includes the title of the target instruction, at least one of the task or the output in the title can be identified, for example, the title is "Chinese-French Translation", and "Chinese-French Translation" can be regarded as the task. Expending can also be automatically carried out in a case where the user only input the title to obtain the prompt information corresponding to the target instruction.

In some embodiments, the content of at least one of the task or the output is expanded according to the content of the at least one of the task or the output and sample prompt information, wherein the sample prompt information comprises sample task description information and sample output description information.

The sample task description information and sample output description information in the sample prompt information are more accurate and standard-compliant. Based on the sample prompt information, the machine learning model can better understand what should be expanded, so as to obtain more accurate prompt information. For example, in a case where the output is "output a summary", expending the output can include expanding the number of words required for the output, expanding other contents of the output, and the like.

In some embodiments, the structured prompt information corresponding to the target instruction is generated according to the task description information and the output description information in the prompt information and the preset structure corresponding to the sample prompt information.

The sample prompt information can include multiple parts according to the preset structure, for example, including the sample task description information and the sample output description information, and the sample output description information can include format, style, constraints, etc. The sample prompt information and its structure can be set according to actual needs. According to the sample prompt information, the structured prompt information corresponding to the target instruction generated by the machine learning model can be more accurate.

In some embodiments, in response to the user triggering an information perfection control in the instruction creation interface, the structured prompt information corresponding to the target instruction is generated according to the information for creating the target instruction input by the user in the instruction creation interface.

As shown in FIG. 2D or 3B, an information perfection control, namely "one-click perfection", is displayed in the instruction content input area. In response to the user triggering the information perfection control, the information for creating the target instruction can be expanded and perfected, and the prompt information corresponding to the target instruction can be obtained and displayed.

"One-click perfection" can correspond to information perfection instruction, which can be created by the user or provided by an application. In response to the user triggering the information perfection control, the information perfection instruction can be sent to the Agent, so that the machine learning model corresponding to the Agent can expand the information for creating the target instruction and obtain the prompt information corresponding to the target instruction. Sending the information perfection instruction to the Agent includes inputting the prompt information corresponding to the information perfection instruction into the machine learning model, and the prompt information corresponding to the information perfection instruction can include the above sample prompt information.

The prompt information generated after expanding and perfecting the information for creating the target instruction will be displayed, and the user can modify the prompt information to obtain the final prompt information corresponding to the target instruction. In some embodiments, the prompt information is displayed; in response to a modification operation of the user on the prompt information, the prompt information according to the modification operation is updated.

In the method of the above embodiments, the information for creating the target instruction is automatically expanded and perfected according to the information for creating the target instruction to obtain the prompt information corresponding to the target instruction, which improves the convenience and efficiency of the user's operation, and in turn the generated prompt information is more accurate, improving the accuracy of the generated the target instruction.

The user can also select not to expand or perfect the information for creating the target instruction, and directly determine the information for creating the target instruction as the prompt information corresponding to the target instruction.

After generating the prompt information corresponding to the target instruction, the operation control of the target instruction can be automatically generated and displayed according to the prompt information. In some embodiments, in response to a confirmation operation of the user on the prompt information, an operation control of the target instruction is generated and the operation control of the target instruction is associated with the prompt information corresponding to the target instruction and the operation control of the target instruction is displayed.

In some embodiments, in response to the user triggering the operation control of the target instruction, the prompt information corresponding to the target instruction is input into the machine learning model corresponding to the Agent, and the interaction function corresponding to the target instruction is generated, and the Agent interacts with the user based on the interaction function.

Sending the target instruction to the Agent can be sending the prompt information to the Agent and inputting the prompt information into the machine learning model. After understanding the prompt information, the machine learning model can output a corresponding response according to the requirements expressed in the prompt information, that is, the Agent has the interaction function corresponding to the target instruction. The target instruction can include two parts: the title and the prompt information, and can also be provided with a unique identifier. The title is used to display in a place such as its corresponding control or the like to facilitate the user's identification, and the prompt information is used to control the Agent to generate a specific type of response.

In some embodiments, in response to a confirmation operation of the user on the prompt information, an interaction function corresponding to the target instruction and an operation control of the target instruction associated with the interaction function are generated, according to the prompt information; and the operation control of the target instruction is displayed.

For example, the user can trigger the generation of the operation control of the target instruction by clicking a "create" control in FIG. 2D or 3B. After the user confirming the prompt information, the interaction function corresponding to the target instruction can be directly generated, which can be an interaction function of a new Agent, that is, create a new Agent with the interaction function. For example, create an Agent that plays a certain role. The operation control of the target instruction can be a control that calls the new Agent. In response to the user triggering the operation control of the target instruction, the new agent is called to interact with the user.

The method of the above embodiments automatically generates the operation control of the target instruction according to the prompt information corresponding to the target instruction, improving the convenience and efficiency of the user's operation, facilitating the user's subsequent application of the target instruction, and enhancing the user's experience.

The operation control of the target instruction can be distributed in different scenarios after it is generated. In some embodiments, in response to the user setting a distribution scenario or according to the target instruction, the distribution scenario of the operation control of the target instruction is determined; and the operation control of the target instruction is displayed in the distribution scenario.

For example, in a case of multiple Agents, the user can set an Agents corresponding to the target instruction and the operation control of the target instruction is displayed in the interaction interface of the Agent corresponding to the target instruction according to the user's setting. For another example, the user can set one or more pages where the target instruction is displayed, and the operation control of the target instruction is displayed in the one or more pages according to the user's setting. For another example, according to the prompt information corresponding to the target instruction, an Agent or a page associated with the target instruction are determined, and the operation control of the target instruction is displayed in the interaction interface of the Agent associated with the target instruction or in the page associated with the target instruction.

By flexibly setting the distribution scenario of the operation control of the target instruction, the user is enabled to operate the operation control of the target instruction more conveniently, thus improving the interaction efficiency.

How to apply the operation control of the target instruction is described below in connection with some embodiments.

In some embodiments, a sending of information corresponding to the target instruction to the Agent is displayed, and response information generated by the Agent based on the target instruction is output, in response to the user triggering the operation control of the target instruction.

Figure 4A:
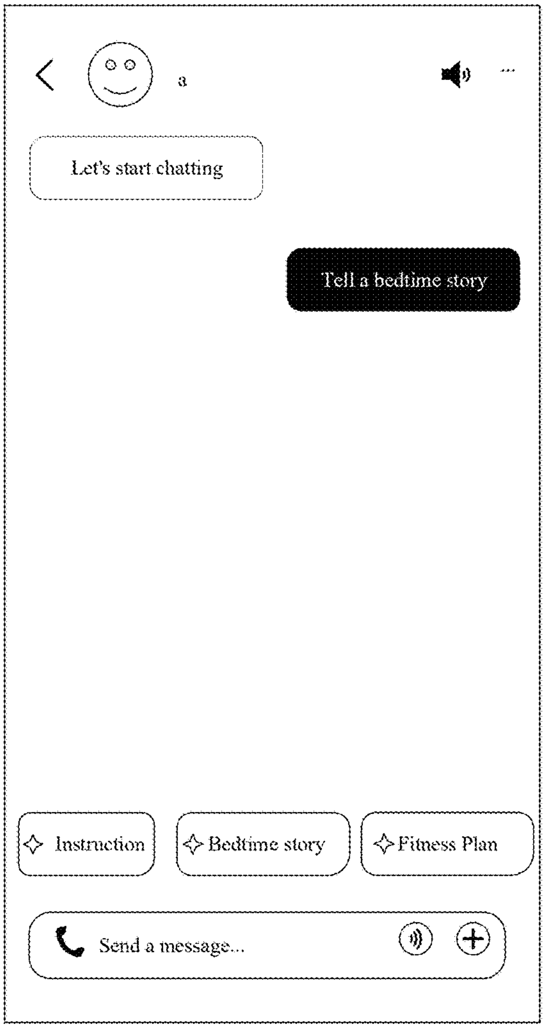

As shown in FIG. 4A, the operation control of the target instruction is, for example, the control of "bedtime story". In response to the user triggering of "bedtime story", information of "telling a bedtime story" can be sent to the Agent, which can be displayed with a preset effect, and then the Agent will generate and display a bedtime story.

In some embodiments, in response to the user triggering the operation control of the target instruction, guidance information for starting interaction based on the target instruction is displayed, and in response to the user inputting second interaction information, response information generated by the Agent based on the target instruction and the second interaction information is output.

Some interaction functions corresponding to target instructions can generate response information without the need for the user to input information, while some interaction functions corresponding to target instruction require the user to input specific information to generate response information. Therefore, there will be different displays and interaction effects for different types of target instructions.

Figure 4B:
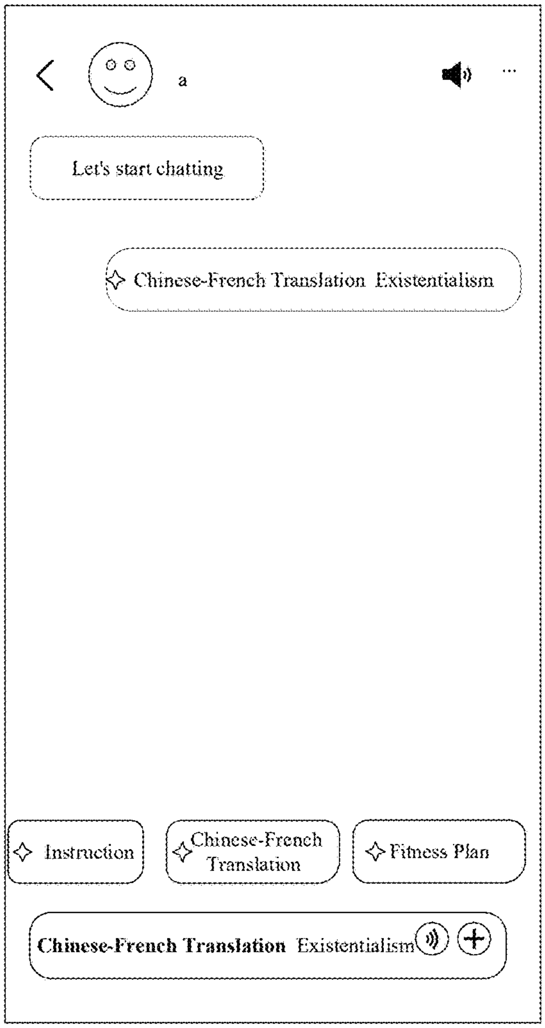

As shown in FIG. 4B, the operation control of the target instruction is, for example, the control of "Chinese-French Translation". In response to the user's triggering of "Chinese-French Translation", the guidance information of "Chinese-French Translation" can be displayed in the input area in a preset way, or the guidance information such as "Starting Chinese-French Translation Now" or the like can be displayed in the display area of interaction information, which is not limited to the given examples. In response to the user's input and the sending of the second interaction information "Existentialism", the second interaction information is displayed in the display area of the interaction information, and the second interaction information can be displayed in a specific way, for example, "Chinese-French translation" and "Existentialism" are displayed together, and an identifier is displayed.

In the method of the above embodiments, the guidance information can be displayed by the user triggering the operation control of the target instruction and the Agent can generate the response information based on the interaction information input by the user and the target instruction, improving the convenience and efficiency of the user's operation.

In some embodiments, guidance information for enabling the target instruction is displayed, in response to third interaction information input by the user matching with the target instruction, a sending of information corresponding to the target instruction to the Agent is displayed, and response information generated by the Agent based on the target instruction is output, in response to a confirmation operation of the user.

The interaction function corresponding to the target instruction can be enabled not only through triggering the operation control of the target instruction by the user, but also through identifying whether the input third interaction information matches the target instruction. For example, when the user inputs "Tell a bedtime story", the "Tell a bedtime story" can be displayed with preset effects (for example, in the forms of highlighting, specific fonts, colors, adding identifiers, etc.) as guidance information to remind the user that "Tell a bedtime story" corresponds to an instruction. After the user confirms, the bedtime story can be generated directly according to the target instruction. Of course, after the user inputs the third interaction information, the guidance information of enabling target instruction may not be displayed, but the guidance information of enabling target instruction may be displayed in the display area of the interaction information after the user confirms to send the third interaction information.

In some embodiments, guidance information for starting interaction based on the target instruction is displayed, in response to fourth interaction information input by the user matching with the target instruction, and response information generated by the Agent based on the target instruction and the fourth interaction information is output, in response to the user inputting the fourth interaction information.

For example, in response to the fourth interaction information "Chinese-French Translation" input by the user, the guidance information of the "Chinese-French Translation" can be displayed in the input area with a preset effect, and the guidance information such as "Starting Chinese-French Translation Now" and the like can also be displayed in the display area of the interaction information, which is not limited to the given examples. In response to the fourth interaction information "Existentialism" input and sent by the user, the fourth interaction information is displayed in the display area of the interaction information, and can be displayed in a specific way, for example, "Chinese-French translation" and "Existentialism" are displayed together, and an identifier is displayed.

In the method of the above embodiments, the interaction information input by the user can be directly matched with the target instruction, and the target instruction is called to interact with the Agent, thus facilitating the usage of the user and improving the efficiency and convenience of operations.

The user can perform various operations on a created instruction, which is described below in connection with some embodiments.

In some embodiments, one or more created instructions are displayed, in response to the user triggering an instruction check function; in response to an editing operation of the user on a first instruction in the one or more instructions, a title and prompt information corresponding to the first instruction are displayed; the title and the prompt information corresponding to the first instruction are updated and displayed, in response to a modification operation of the user on at least one of the title or the prompt information corresponding to the first instruction; and in response to a confirmation operation of the user on the title and the prompt information corresponding to the updated first instruction, the updated operation control of the first instruction is displayed.

In some embodiments, one or more created instructions is displayed, in response to the user triggering an instruction check function; and in response to a delete operation of the user on a second instruction in the one or more created instructions, the operation control of the second instruction is displayed.

Figure 4C:
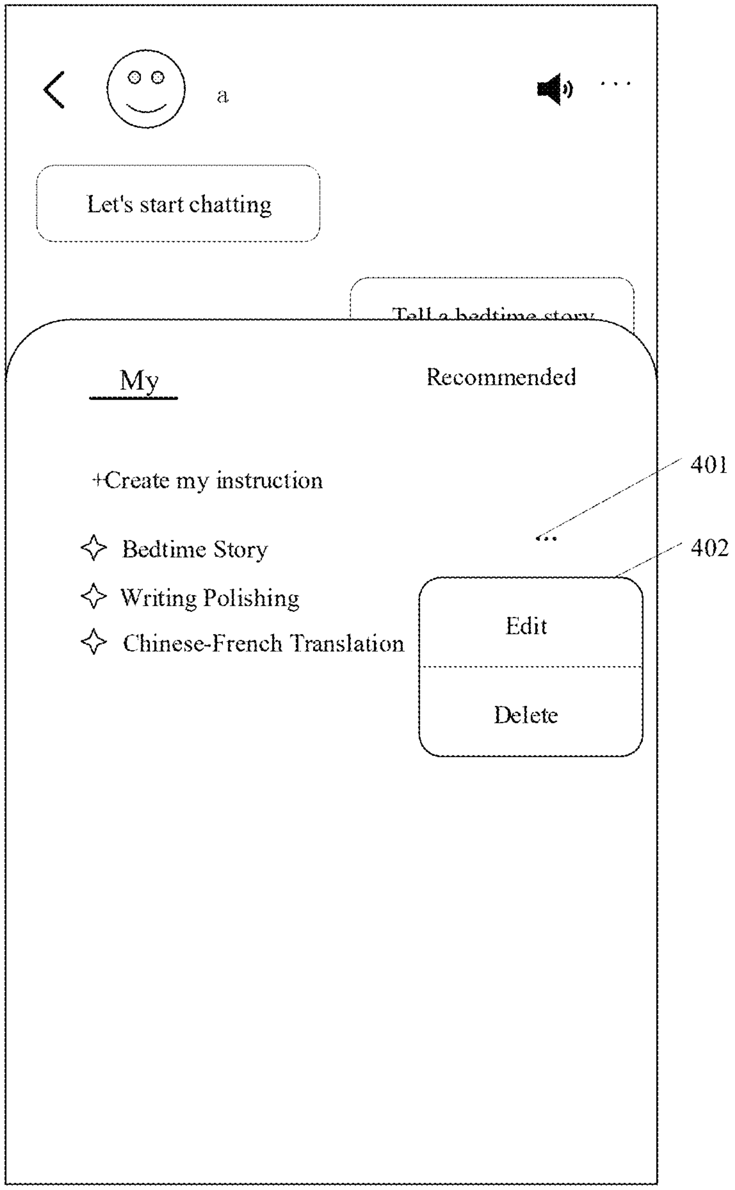

For example, as shown in FIG. 2B or 4C, in response to the user triggering the instruction check control, the instruction display interface is displayed, and the created instructions are displayed in the first tab page. As shown in FIG. 4C, each created instruction can correspond to one operation control 401. In response to the user triggering the operation control of the first instruction, an operation window (or interface) is displayed, which includes an edit control and a delete control. The user can modify the title and/or the prompt information of the first instruction by triggering the edit control, and delete the second instruction by triggering the delete control.

In the method of the above embodiments, the user can perform edit and delete operations on the created instruction, and flexibly manage the created instruction, thereby improving the user experience.

The present disclosure also provides an interaction device, which is described below in conjunction with FIG. 5.

Figure 5:
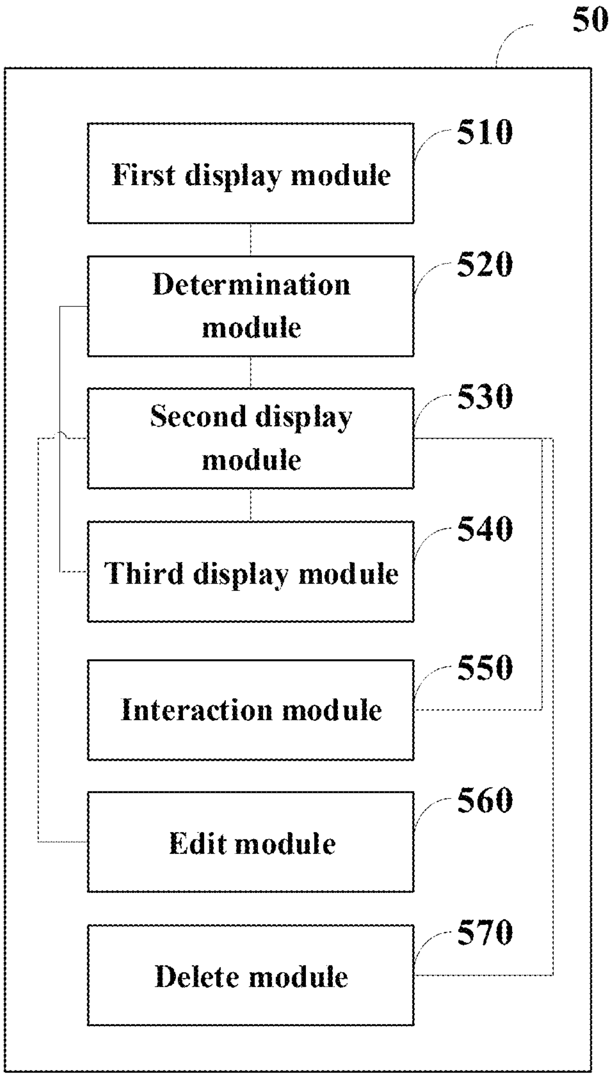
FIG. 5 is a schematic structural diagram of an interaction device provided in some embodiments of the present disclosure.

FIG. 5 is a structural diagram of some embodiments of the interaction device of the present disclosure. As shown in FIG. 5, the interaction device 50 of this embodiment includes: a first display module 510, a determination module 520, and a second display module 530.

The first display module 510 is configured to display, in response to a user triggering an instruction creation function, an instruction creation interface.

The determination module 520 is configured to determine prompt information corresponding to a target instruction according to information for creating the target instruction input by the user in the instruction creation interface, wherein the target instruction is configured to indicate demand information of the user for an interaction function of an Agent.

The second display module 530 is configured to generate and display an operation control of the target instruction according to the prompt information.

In some embodiments, the second display module 530 is configured to determine, in response to the user setting a distribution scenario or according to the target instruction, the distribution scenario of the operation control of the target instruction; display the operation control of the target instruction in the distribution scenario.

In some embodiments, the determination module 520 is configured to generate structured prompt information corresponding to the target instruction according to the information for creating the target instruction input by the user in the instruction creation interface.

In some embodiments, the determination module 520 is configured to parse the information for creating the target instruction to determine content of at least one of a task or an output comprised in the information for creating the target instruction; expand the content of at least one of the task or the output to generate task description information and output description information in the prompt information; and generate the structured prompt information corresponding to the target instruction according to the task description information and the output description information.

In some embodiments, the determination module 520 is configured to expand the content of at least one of the task or the output according to the content of the at least one of the task or the output and sample prompt information, wherein the sample prompt information comprises sample task description information and sample output description information.

In some embodiments, the determination module 520 is configured to generate the structured prompt information corresponding to the target instruction according to the task description information and the output description information in the prompt information and the preset structure corresponding to the sample prompt information.

In some embodiments, the determination module 520 is configured to generate, in response to the user triggering an information perfection control in the instruction creation interface, the structured prompt information corresponding to the target instruction according to the information for creating the target instruction input by the user in the instruction creation interface.

In some embodiments, the instruction creation interface comprises a title input area and an instruction content input area; the information for creating the target instruction comprises at least one of a title of the target instruction or content of the target instruction; the title of the target instruction is displayed in the operation control of the target instruction, in response to the information for creating the target instruction comprising the title of the target instruction; and a title generated according to the prompt information is displayed in the operation control of the target instruction, in response to the information for creating the target instruction not comprising the title of the target instruction.

In some embodiments, the second display module 530 is configured to generate, in response to a confirmation operation of the user on the prompt information, an interaction function corresponding to the target instruction and an operation control of the target instruction associated with the interaction function according to the prompt information; and display the operation control of the target instruction.

In some embodiments, the first display module 510 is configured to display an operation control of the instruction creation function; and display the instruction creation interface in response to the user triggering the operation control of the instruction creation function.

In some embodiments, the first display module 510 is configured to display, in response to the user inputting first interaction information, the first interaction information; and display the instruction creation interface, and display the first interaction information in the instruction creation interface as information for creating the target instruction, in response to the user triggering the instruction creation function for the first interaction information.

In some embodiments, the interaction device 50 further includes: a third display module 540, configured to display the prompt information; and update, in response to a modification operation of the user on the prompt information, the prompt information according to the modification operation.

In some embodiments, the interaction device 50 further includes an interaction module 550, configured to display a sending of information corresponding to the target instruction to the Agent, and outputting response information generated by the Agent based on the target instruction, in response to the user triggering the operation control of the target instruction; or display, in response to the user triggering the operation control of the target instruction, guidance information for starting interaction based on the target instruction, and output, in response to the user inputting second interaction information, response information generated by the Agent based on the target instruction and the second interaction information.

In some embodiments, the interaction module 550 is configured to: display guidance information for enabling the target instruction, in response to third interaction information input by the user matching with the target instruction, display a sending of information corresponding to the target instruction to the Agent, and output response information generated by the Agent based on the target instruction, in response to a confirmation operation of the user; or display guidance information for starting interaction based on the target instruction, in response to fourth interaction information input by the user matching with the target instruction, and output response information generated by the Agent based on the target instruction and the fourth interaction information, in response to the user inputting the fourth interaction information.

In some embodiments, the interaction device 50 further includes an edit module 560, configured to display one or more created instructions, in response to the user triggering an instruction check function; display, in response to an editing operation of the user on a first instruction in the one or more instructions, a title and prompt information corresponding to the first instruction; update and display, the title and the prompt information corresponding to the first instruction, in response to a modification operation of the user on at least one of the title or the prompt information corresponding to the first instruction; and display, in response to a confirmation operation of the user on the title and the prompt information corresponding to the updated first instruction, the updated operation control of the first instruction.

In some embodiments, the interaction device 50 further includes a delete module 570, configured to display one or more created instructions, in response to the user triggering an instruction check function; and delete, in response to a delete operation of the user on a second instruction in the one or more created instructions, the operation control of the second instruction.

It should be noted that all units (modules) mentioned above are only logical modules divided according to specific functions realized by them, and are not used to limit specific implementation methods, for example, they can be implemented by a method of software, hardware or a combination of software and hardware. In actual implementation, all above units can be realized as independent physical entities, or can also be realized by a single entity (for example, a processor (CPU or DSP, etc.), an integrated circuit, etc.). In addition, each unit mentioned above are shown by dotted lines in the drawings, indicating that these units may not actually exist, and the operations/functions they realize can be realized by the processing circuit itself.

Moreover, although not shown, the device can also include a memory, which can store various information generated by the device and various units included in the device during operation, programs and data used for operation, data to be transmitted by the communication unit, and the like. The memory can be a volatile memory and/or a nonvolatile memory. For example, the memory may include, but is not limited to, Random Access Memory (RAM), Dynamic Random Access Memory (DRAM), Static Random Access Memory (SRAM), Read-Only Memory (ROM), and flash memory. Of course, the memory may also be located outside the device. Alternatively, although not shown, the device can also include a communication unit, which can be used to communicate with other devices. In one example, the communication unit can be implemented in an appropriate manner known in the art, including, for example, communication components such as antenna array and/or radio frequency link, various types of interfaces, communication units, and the like, which will not be elaborated here. Furthermore, the device can also include other components not shown, such as radio frequency link, baseband processing unit, network interface, processor, controller, etc., which will not be elaborated here.

Figure 6:
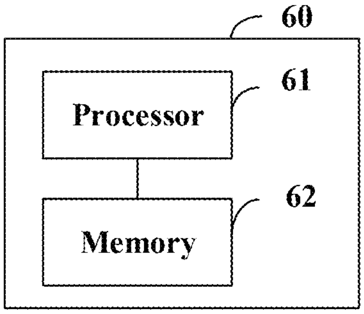
FIG. 6 is a schematic structural diagram of an electronic apparatus provided in some embodiments of the present disclosure.

Some embodiments of the present disclosure also provide an electronic apparatus. FIG. 6 shows a block diagram of some embodiments of the electronic apparatus of the present disclosure. For example, in some embodiments, the electronic apparatus 60 can be various types of apparatuses, including, for example, but not limited to, mobile terminals such as mobile phone, notebook computer, digital broadcast receiver, PDA (Personal Digital Assistant), PAD (Tablet Computer), PMP (Portable Multimedia Player), vehicle-mounted terminal (such as vehicle-mounted navigation terminal) and fixed terminal such as digital TV and desktop computer. For example, the electronic apparatus 60 can include a display panel for displaying data and/or execution results utilized in the schemes according to the present disclosure. For example, the display panel can be in various shapes, such as a rectangular panel, an oval panel or a polygonal panel. Additionally, the display panel can be not only a flat panel, but also a curved panel or even a spherical panel.

As shown in FIG. 6, the electronic apparatus 60 of this embodiment includes a memory 61 and a processor 62 coupled to the memory 61. It should be noted that the components of the electronic apparatus 60 shown in FIG. 6 are only exemplary, not restrictive, and the electronic apparatus 60 may also have other components according to actual application requirements. The processor 62 can control other components in the electronic apparatus 60 to perform desired functions.

In some embodiments, the memory 61 is used to store one or more computer-readable instructions. When the processor 62 is used to execute computer-readable instructions, the computer-readable instructions, when executed by the processor 62, realize the interaction method according to any of the above embodiments. For the specific implementation of each step of the method and related explanations, please refer to the aforementioned embodiments, which will not be repeated here.

For example, the processor 62 and the memory 61 can communicate with each other directly or indirectly. For example, the processor 62 and the memory 61 can communicate through a network. The network can include a wireless network, a wired network, and/or any combination of wireless and wired networks. The processor 62 and the memory 61 can also communicate with each other through s system bus, which is not limited by the present disclosure.

For example, the processor 62 can be embodied as various appropriate processors, processing devices, etc., such as a Central Processing Unit (CPU), a Graphics Processing Unit (GPU), a Network Processor (NP), etc. It can also be a Digital Signal Processor (DSP), an Application Specific Integrated Circuit (ASIC), a Field Programmable Gate Array (FPGA) or other programmable logic devices, discrete gate or transistor logic devices, and discrete hardware components. The Central Processing Unit (CPU) can be X86 or ARM architecture. For example, the memory 61 can include any combination of various forms of computer-readable storage media, such as volatile memory and/or nonvolatile memory. The memory 61 can include, for example, a system memory that stores, for example, an operating system, application programs, a Boot Loader, a database and other programs. Various applications and data can also be stored in the storage medium.

Figure 7:
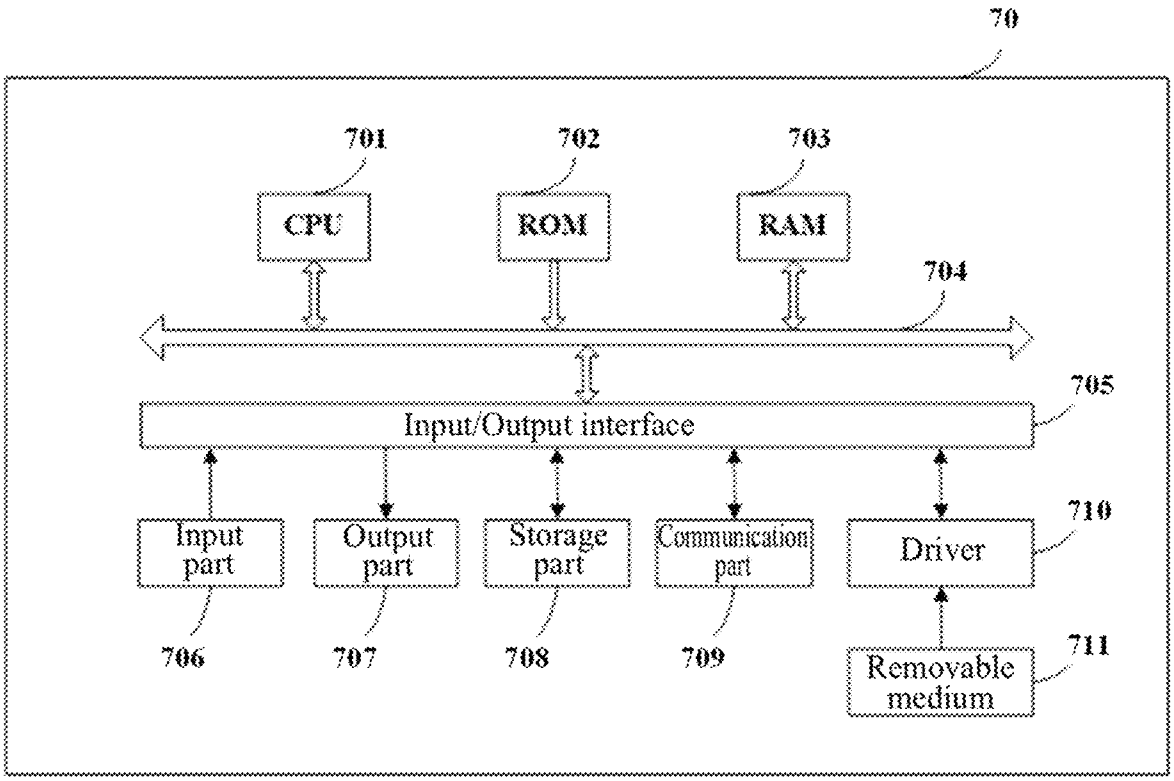
FIG. 7 is a schematic structural diagram of a computer system provided in some embodiments of the present disclosure.

In addition, according to some embodiments of the present disclosure, in the case where various operations/processes according to the present disclosure are realized by software and/or firmware, programs constituting the software can be installed from a storage medium or a network to a computer system with a dedicated hardware structure, such as the computer system (or electronic apparatus) 70 shown in FIG. 7, and the computer system can perform various functions, including such functions as those described above, when various programs are installed. FIG. 7 is a block diagram showing an example structure of a computer system that can be employed in an embodiment of the present disclosure.

In FIG. 7, the Central Processing Unit (CPU) 701 performs various processes according to a program stored in a Read-Only Memory (ROM) 702 or a program loaded from a storage part 708 into a Random Access Memory (RAM) 703. In the RAM 703, data required when the CPU 701 executes various processes and the like are also stored as necessary. The Central Processing Unit is only exemplary, and it can also be other types of processors, such as the various processors mentioned above. The ROM 702, RAM 703 and storage part 708 can be various forms of computer-readable storage media, as follows. It should be noted that although the ROM 702, the RAM 703 and the storage section 708 are shown in FIG. 7, one or more of them can be combined or located in the same or different memories or storage modules.

The CPU 701, ROM 702 and RAM 703 are connected to each other via a bus 704. An input/output interface 705 is also connected to the bus 704.

The following components are connected to the input/output interface 705: an input part 706 such as a touch screen, a touch pad, a keyboard, a mouse, an image sensor, a microphone, an accelerometer, a gyroscope, etc.; an output part 707, including a display such as a Cathode Ray Tube (CRT), a Liquid Crystal Display (LCD), a speaker, a vibrator, etc.; a storage part 708, including a hard disk, a magnetic tape, etc.; and a communication part 709, including a network interface card such as a LAN card, a modem, etc. The communication part 709 allows communication processing to be performed via a network such as the Internet. It is easy to understand that although various devices or modules in the computer system 70 shown in FIG. 7 communicate through the bus 704, they can also communicate through a network or other means, wherein the network can include a wireless network, a wired network, and/or any combination of the wireless network and the wired network.

A drive 710 is also connected to the input/output interface 705 as needed. A removable medium 711, such as a magnetic disk, an optical disk, a magneto-optical disk, a semiconductor memory, etc., is mounted on the drive 710 as needed, so that a computer program read from it is installed in the storage part 708 as needed.

In the case where the above-mentioned series of processes are realized by software, a program constituting the software may be installed from a network such as the Internet or a storage medium such as the removable medium 711.

According to embodiments of the present disclosure, the process described above with reference to the flowchart can be implemented as a computer software program. For example, the embodiment of the present disclosure includes a computer program product, which includes a computer program carried on a computer-readable medium, and the computer program includes program code for executing the method shown in the flowchart. In such an embodiment, the computer program can be downloaded and installed from the network through the communication device 709, or installed from the storage device 708, or installed from the ROM 702. When the computer program is executed by the CPU 701, the above functions defined in the interaction method of the embodiments of the present disclosure are executed.

It should be noted that in the context of the present disclosure, the computer-readable medium can be a tangible medium, which can include or store a program for use by or in combination with an instruction execution system, device or apparatus. The computer-readable medium can be a computer-readable signal medium or a computer-readable storage medium or any combination of both. The computer-readable storage medium can be, for example, but not limited to: an electrical, magnetic, optical, electromagnetic, infrared, or semiconductor system, device or component, or any combination of the above. More specific examples of computer-readable storage media can include, but are not limited to, an electrical connection with one or more wires, a portable computer disk, a hard disk, a Random Access Memory (RAM), a Read-Only Memory (ROM), an Erasable Programmable Read-Only Memory (EPROM or flash memory), an optical fiber, a portable Compact Disk Read-Only Memory (CD-ROM), an optical storage device, a magnetic storage device, or any suitable combination of the above. In the present disclosure, a computer-readable storage medium can be any tangible medium including or storing a program, which can be used by or in combination with an instruction execution system, device or component. In the present disclosure, a computer-readable signal medium can include a data signal propagated in baseband or as part of a carrier wave, in which computer-readable program codes are carried. This propagated data signal can take many forms, including but not limited to electromagnetic signals, optical signals or any suitable combination of the above. A computer-readable signal medium can also be any computer-readable medium other than a computer-readable storage medium, which can send, propagate or transmit a program for use by or in connection with an instruction execution system, device or component. The program code included in the computer-readable medium can be transmitted by any suitable medium, including but not limited to: wires, optical cables, RF (radio frequency) and the like, or any suitable combination of the above.

The computer-readable medium can be included in the above electronic apparatus; or it can exist alone without being assembled into the said electronic apparatus.

In some embodiments, there is also provided a computer program, including: instructions which, when executed by a processor, cause the processor to perform the interaction method of any of the above embodiments. For example, the instructions can be embodied in computer program code.

In the embodiments of the present disclosure, the computer program codes for performing the operations of the present disclosure can be written in one or more programming languages or their combinations, including but not limited to object-oriented programming languages such as Java, Smalltalk, C++, and conventional procedural programming languages such as “C” or similar programming languages. The program code can be completely executed on the user’s computer, partially executed on the user’s computer, executed as an independent software package, partially executed on the user’s computer and partially executed on a remote computer, or completely executed on a remote computer or server. In the case involving a remote computer, the remote computer can be connected to a user computer through any kind of network (including a Local Area Network (LAN) or a Wide Area Network (WAN)), or can be connected to an external computer (for example, through the Internet using an Internet service provider).

The flowcharts and block diagrams in the drawings illustrate architecture, functions and operations of possible implementations of the systems, methods and computer program products according to various embodiments of the present disclosure. In this regard, each block in the flowchart or block diagram can represent a module, a program segment, or a part of code that includes one or more executable instructions for implementing specified logical functions. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The modules, parts or units described in the embodiments of the present disclosure can be realized by software or hardware. Among them, the name of the module, part or unit does not constitute the limitation on the module, part or unit itself in some cases.

The functions described above herein can be at least partially performed by one or more hardware logic components. For example, without limitation, exemplary hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

According to some embodiments of the present disclosure, an interaction method is provided, comprising: displaying, in response to a user triggering an instruction creation function, an instruction creation interface; determining prompt information corresponding to a target instruction according to information for creating the target instruction input by the user in the instruction creation interface, wherein the target instruction is configured to indicate demand information of the user for an interaction function of an Agent; and generating and displaying an operation control of the target instruction according to the prompt information.

In some embodiments, the displaying an operation control of the target instruction comprises: determining, in response to the user setting a distribution scenario or according to the target instruction, the distribution scenario of the operation control of the target instruction; and displaying the operation control of the target instruction in the distribution scenario.

In some embodiments, the determining prompt information corresponding to a target instruction according to information for creating the target instruction input by the user in the instruction creation interface comprises: generating structured prompt information corresponding to the target instruction according to the information for creating the target instruction input by the user in the instruction creation interface.

In some embodiments, the generating structured prompt information corresponding to the target instruction according to the information for creating the target instruction input by the user in the instruction creation interface comprises: parsing the information for creating the target instruction to determine content of at least one of a task or an output comprised in the information for creating the target instruction; expanding the content of at least one of the task or the output to generate task description information and output description information in the prompt information; and generating the structured prompt information corresponding to the target instruction according to the task description information and the output description information.

In some embodiments, the expanding the content of at least one of the task or the output comprises: expanding the content of at least one of the task or the output according to the content of the at least one of the task or the output and sample prompt information, wherein the sample prompt information comprises sample task description information and sample output description information.

In some embodiments, the sample prompt information is structured prompt information generated from the sample task description information and the sample output description information according to a preset structure, the generating the structured prompt information corresponding to the target instruction comprises: generating the structured prompt information corresponding to the target instruction according to the task description information and the output description information in the prompt information and the preset structure corresponding to the sample prompt information.

In some embodiments, the generating structured prompt information corresponding to the target instruction according to the information for creating the target instruction input by the user in the instruction creation interface comprises: generating, in response to the user triggering an information perfection control in the instruction creation interface, the structured prompt information corresponding to the target instruction according to the information for creating the target instruction input by the user in the instruction creation interface.

In some embodiments, the instruction creation interface comprises a title input area and an instruction content input area; the information for creating the target instruction comprises at least one of a title of the target instruction or content of the target instruction; the title of the target instruction is displayed in the operation control of the target instruction, in response to the information for creating the target instruction comprising the title of the target instruction; and a title generated according to the prompt information is displayed in the operation control of the target instruction, in response to the information for creating the target instruction not comprising the title of the target instruction.

In some embodiments, the generating and displaying an operation control of the target instruction according to the prompt information comprises: generating, in response to a confirmation operation of the user on the prompt information, an interaction function corresponding to the target instruction and an operation control of the target instruction associated with the interaction function according to the prompt information; and displaying the operation control of the target instruction.

In some embodiments, the displaying, in response to a user triggering an instruction creation function, an instruction creation interface comprises: displaying an operation control of the instruction creation function; and displaying the instruction creation interface in response to the user triggering the operation control of the instruction creation function.

In some embodiments, the displaying, in response to a user triggering an instruction creation function, an instruction creation interface comprises: displaying, in response to the user inputting first interaction information, the first interaction information; and displaying the instruction creation interface, and displaying the first interaction information in the instruction creation interface as information for creating the target instruction, in response to the user triggering the instruction creation function for the first interaction information.

In some embodiments, the interaction method further comprises: displaying the prompt information; and updating, in response to a modification operation of the user on the prompt information, the prompt information according to the modification operation.

In some embodiments, the interaction method further comprises: displaying a sending of information corresponding to the target instruction to the Agent, and outputting response information generated by the Agent based on the target instruction, in response to the user triggering the operation control of the target instruction; or displaying, in response to the user triggering the operation control of the target instruction, guidance information for starting interaction based on the target instruction, and outputting, in response to the user inputting second interaction information, response information generated by the Agent based on the target instruction and the second interaction information.

In some embodiments, the interaction method further comprises: displaying guidance information for enabling the target instruction, in response to third interaction information input by the user matching with the target instruction, displaying a sending of information corresponding to the target instruction to the Agent, and outputting response information generated by the Agent based on the target instruction, in response to a confirmation operation of the user; or displaying guidance information for starting interaction based on the target instruction, in response to fourth interaction information input by the user matching with the target instruction, and outputting response information generated by the Agent based on the target instruction and the fourth interaction information, in response to the user inputting the fourth interaction information.

In some embodiments, the interaction method further comprises: displaying one or more created instructions, in response to the user triggering an instruction check function; displaying, in response to an editing operation of the user on a first instruction in the one or more instructions, a title and prompt information corresponding to the first instruction; updating and displaying, the title and the prompt information corresponding to the first instruction, in response to a modification operation of the user on at least one of the title or the prompt information corresponding to the first instruction; and displaying, in response to a confirmation operation of the user on the title and the prompt information corresponding to the updated first instruction, the updated operation control of the first instruction.

In some embodiments, the interaction method further comprises: displaying one or more created instructions, in response to the user triggering an instruction check function; and deleting, in response to a delete operation of the user on a second instruction in the one or more created instructions, the operation control of the second instruction.

According to other embodiments of the present disclosure, an interaction device is provided, comprising: a first display module, configured to display, in response to a user triggering an instruction creation function, an instruction creation interface; a determination module, configured to determine prompt information corresponding to a target instruction according to information for creating the target instruction input by the user in the instruction creation interface, wherein the target instruction is configured to indicate demand information of the user for an interaction function of an Agent; and a second display module, configured to generate and display an operation control of the target instruction according to the prompt information.

According to further embodiments of the present disclosure, an electronic apparatus is provided, comprising: comprising one or more processors; and one or more memories, coupled to the one or more processors, for storing instructions which, when executed by the one or more processors, cause the one or more processors to perform the interaction method provided in any of the embodiments of the present disclosure.

According to still further embodiments of the present disclosure, a computer-readable storage medium, on which a computer program is stored, wherein, when executed by a processor, causes the processor to perform the interaction method according to any of the embodiments of the present disclosure.

According to yet further embodiments of the present disclosure, a computer program product, comprising: instructions which, when executed by a processor, implement the interaction method according to any of the embodiment of the present disclosure.

According to still further embodiments of the present disclosure, a computer program is provided, comprising: instructions which, when executed by a processor, implement the interaction method according to any of the embodiments of the present disclosure.

The above descriptions are only some embodiments of the present disclosure and explanations of the applied technical principles. It should be understood by those skilled in the art that the disclosing scope involved in the present disclosure is not limited to the technical scheme formed by the specific combination of the above technical features, but also covers other technical schemes formed by any combination of the above technical features or their equivalent features if without departing from the above disclosure concept. For example, the above features are replaced with (but not limited to) technical features with similar functions disclosed in the present disclosure to from a technical scheme.

In the description provided herein, numerous specific details are set forth. However, it is understood that embodiments of the present invention can be practiced without these specific details. In other instances, well-known methods, structures and techniques have not been shown in detail in order not to obscure the understanding of this description.

Furthermore, although the operations are depicted in a particular order, this should not be understood as requiring that these operations be performed in the particular order shown or in a sequential order. Under certain circumstances, multitasking and parallel processing may be beneficial. Likewise, although several specific implementation details are included in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although some specific embodiments of the present disclosure have been elaborated through examples, it should be understood by those skilled in the art that the above examples are only for illustration and are not intended to limit the scope of the present disclosure. It should be understood by those skilled in the art that the above embodiments can be modified in the case of without departing from the scope and spirit of the present disclosure. The scope of the present disclosure is defined by the appended claims.

The invention claimed is:

1. An interaction method, comprising:

displaying an interaction interface, wherein the interaction interface is associated with a first Agent, and displays an instruction control of an instruction creation function;

displaying, in response to a user triggering the instruction control, an instruction creation interface;

determining prompt information corresponding to a target instruction according to information for creating the target instruction input by the user in the instruction creation interface;

generating and displaying an operation control of the target instruction on the interaction interface according to the prompt information;

when the target instruction is a first type, displaying a sending of information corresponding to the target instruction to the first Agent, and outputting response information generated by the first Agent based on the target instruction in an interaction interface between the user and the first Agent, in response to the user triggering the operation control of the target instruction; and when the target instruction is a second type, displaying, in response to the user triggering the operation control of the target instruction, guidance information for starting interaction based on the target instruction in the interaction interface between the user and the first Agent, and outputting, in response to the user inputting second interaction information, response information generated by the first Agent based on the target instruction and the second interaction information in the interaction interface between the user and the first Agent.

2. The interaction method according to claim 1, further comprising:

determining, in response to the user setting a distribution scenario or according to the target instruction, the distribution scenario of the operation control of the target instruction; and displaying the operation control of the target instruction in the distribution scenario.

3. The interaction method according to claim 1, wherein the determining prompt information corresponding to a target instruction according to information for creating the target instruction input by the user in the instruction creation interface comprises:

generating structured prompt information corresponding to the target instruction according to the information for creating the target instruction input by the user in the instruction creation interface.

4. The interaction method according to claim 3, wherein the generating structured prompt information corresponding to the target instruction according to the information for creating the target instruction input by the user in the instruction creation interface comprises:

parsing the information for creating the target instruction to determine content of at least one of a task or an output comprised in the information for creating the target instruction;

expanding the content of at least one of the task or the output to generate task description information and output description information in the prompt information; and generating the structured prompt information corresponding to the target instruction according to the task description information and the output description information.

5. The interaction method according to claim 4, wherein the expanding the content of at least one of the task or the output comprises:

expanding the content of at least one of the task or the output according to the content of the at least one of the task or the output and sample prompt information, wherein the sample prompt information comprises sample task description information and sample output description information.

6. The interaction method according to claim 5, wherein the sample prompt information is structured prompt information generated from the sample task description information and the sample output description information according to a preset structure, the generating the structured prompt information corresponding to the target instruction comprises:

generating the structured prompt information corresponding to the target instruction according to the task description information and the output description information in the prompt information and the preset structure corresponding to the sample prompt information.

7. The interaction method according to claim 3, wherein the generating structured prompt information corresponding to the target instruction according to the information for creating the target instruction input by the user in the instruction creation interface comprises:

generating, in response to the user triggering an information perfection control in the instruction creation interface, the structured prompt information corresponding to the target instruction according to the information for creating the target instruction input by the user in the instruction creation interface.

8. The interaction method according to claim 1, wherein:

the instruction creation interface comprises a title input area and an instruction content input area;

the information for creating the target instruction comprises at least one of a title of the target instruction or content of the target instruction;

the title of the target instruction is displayed in the operation control of the target instruction, in response to the information for creating the target instruction comprising the title of the target instruction; and a title generated according to the prompt information is displayed in the operation control of the target instruction, in response to the information for creating the target instruction not comprising the title of the target instruction.

9. The interaction method according to claim 1, wherein the generating and displaying an operation control of the target instruction on the interaction interface according to the prompt information comprises:

generating, in response to a confirmation operation of the user on the prompt information, the interaction function corresponding to the target instruction and an operation control of the target instruction associated with the interaction function according to the prompt information; and displaying the operation control of the target instruction on the interaction interface.

10. The interaction method according to claim 1, wherein the displaying, in response to a user triggering an instruction creation function, an instruction creation interface comprises:

displaying, in response to the user inputting first interaction information, the first interaction information; and displaying the instruction creation interface, and displaying the first interaction information in the instruction creation interface as information for creating the target instruction, in response to the user triggering the instruction creation function for the first interaction information.

11. The interaction method according to claim 1, further comprising:

displaying the prompt information; and updating, in response to a modification operation of the user on the prompt information, the prompt information according to the modification operation.

12. The interaction method according to claim 1, further comprising:

displaying guidance information for enabling the target instruction, in response to third interaction information input by the user matching with the target instruction, displaying a sending of information corresponding to the target instruction to the first Agent, and outputting response information generated by the first Agent based on the target instruction, in response to a confirmation operation of the user; or displaying guidance information for starting interaction based on the target instruction, in response to fourth interaction information input by the user matching with the target instruction, and outputting response information generated by the first Agent based on the target instruction and fifth interaction information, in response to the user inputting the fifth interaction information.

13. The interaction method according to claim 1, further comprising: displaying one or more created instructions, in response to the user triggering an instruction check function;

displaying, in response to an editing operation of the user on a first instruction in the one or more instructions, a title and prompt information corresponding to the first instruction;

updating and displaying, the title and the prompt information corresponding to the first instruction, in response to a modification operation of the user on at least one of the title or the prompt information corresponding to the first instruction; and displaying, in response to a confirmation operation of the user on the title and the prompt information corresponding to the updated first instruction, the updated operation control of the first instruction.

14. The interaction method according to claim 1, further comprising:

displaying one or more created instructions, in response to the user triggering an instruction check function; and deleting, in response to a delete operation of the user on a second instruction in the one or more created instructions, the operation control of the second instruction.

15. An electronic apparatus, comprising:

one or more processors; and one or more memories, coupled to the one or more processors, for storing instructions which, when executed by the one or more processors, cause the one or more processors to:

display an interaction interface, wherein the interaction interface is associated with a first Agent, and displays an instruction control of an instruction creation function;

display, in response to a user triggering the instruction control, an instruction creation interface;

determine prompt information corresponding to a target instruction according to information for creating the target instruction input by the user in the instruction creation interface;

generate and display an operation control of the target instruction on the interaction interface according to the prompt information;

when the target instruction is a first type, display a sending of information corresponding to the target instruction to the first Agent, and output response information generated by the first Agent based on the target instruction in an interaction interface between the user and the first Agent, in response to the user triggering the operation control of the target instruction; and when the target instruction is a second type, display, in response to the user triggering the operation control of the target instruction, guidance information for starting interaction based on the target instruction in the interaction interface between the user and the first Agent, and output, in response to the user inputting second interaction information, response information generated by the first Agent based on the target instruction and the second interaction information in the interaction interface between the user and the first Agent.

16. The electronic apparatus according to claim 15, wherein the instructions, when executed by the one or more processors, cause the one or more processors to:

determine, in response to the user setting a distribution scenario or according to the target instruction, the distribution scenario of the operation control of the target instruction; and display the operation control of the target instruction in the distribution scenario.

17. The electronic apparatus according to claim 15, wherein the determining prompt information corresponding to a target instruction according to information for creating the target instruction input by the user in the instruction creation interface comprises:

generating structured prompt information corresponding to the target instruction according to the information for creating the target instruction input by the user in the instruction creation interface.

18. A non-transitory computer-readable storage medium, on which a computer program is stored, wherein the program when executed by a processor, causes the processor to:

display an interaction interface, wherein the interaction interface is associated with a first Agent, and displays an instruction control of an instruction creation function;

display, in response to a user triggering the instruction control, an instruction creation interface;

determine prompt information corresponding to a target instruction according to information for creating the target instruction input by the user in the instruction creation interface;

generate and display an operation control of the target instruction on the interaction interface according to the prompt information;

when the target instruction is a first type, display a sending of information corresponding to the target instruction to the first Agent, and output response information generated by the first Agent based on the target instruction in an interaction interface between the user and the first Agent, in response to the user triggering the operation control of the target instruction; and when the target instruction is a second type, display, in response to the user triggering the operation control of the target instruction, guidance information for starting interaction based on the target instruction in the interaction interface between the user and the first Agent, and output, in response to the user inputting second interaction information, response information generated by the first Agent based on the target instruction and the second interaction information in the interaction interface between the user and the first Agent.

19. The non-transitory computer-readable storage medium according to claim 18, wherein:

the instruction creation interface comprises a title input area and an instruction content input area;

the information for creating the target instruction comprises at least one of a title of the target instruction or content of the target instruction;

the title of the target instruction is displayed in the operation control of the target instruction, in response to the information for creating the target instruction comprising the title of the target instruction; and a title generated according to the prompt information is displayed in the operation control of the target instruction, in response to the information for creating the target instruction not comprising the title of the target instruction.

* * * * *